United States Patent Office 2,851,582
Patented Sept. 9, 1958

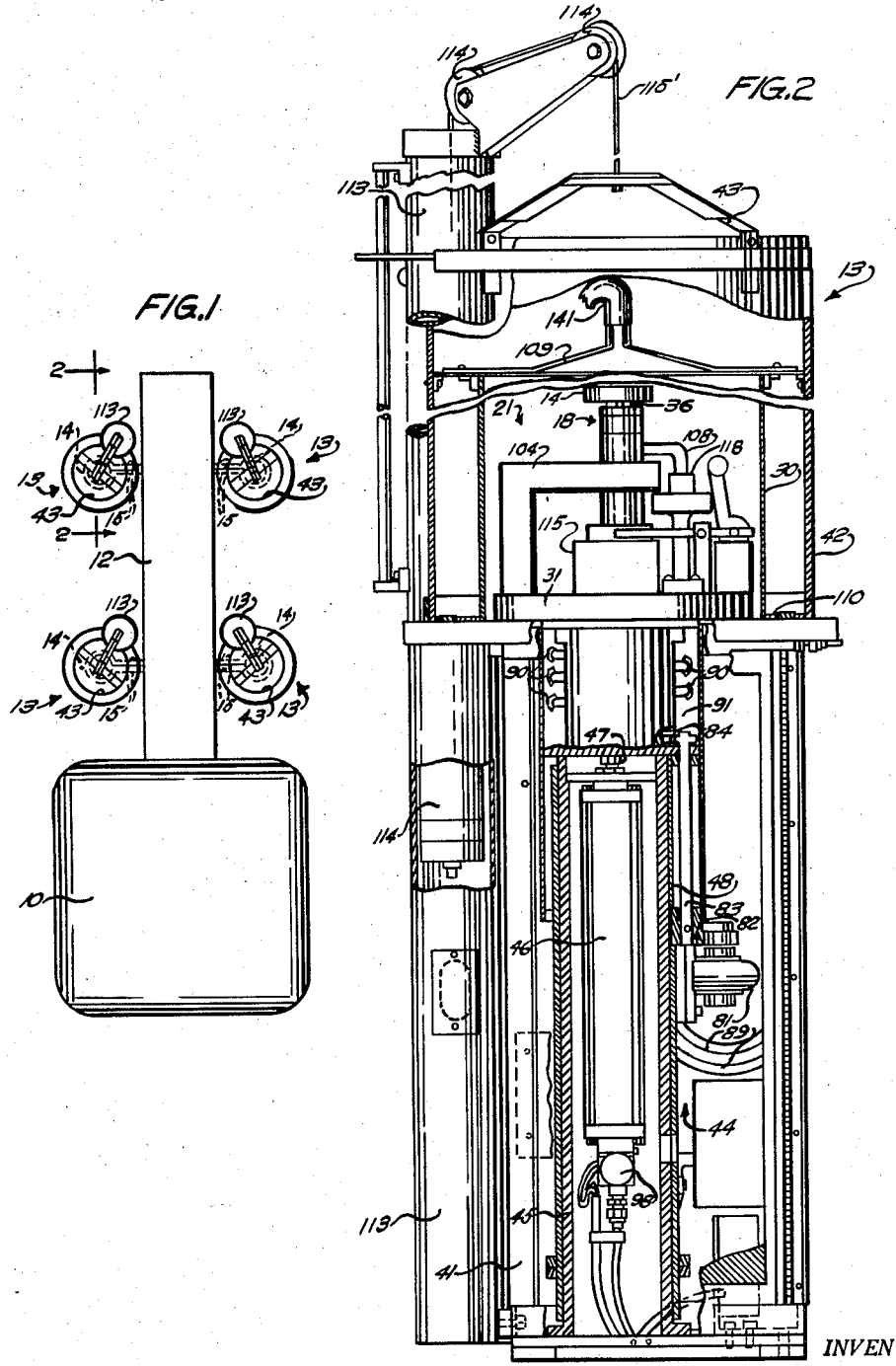

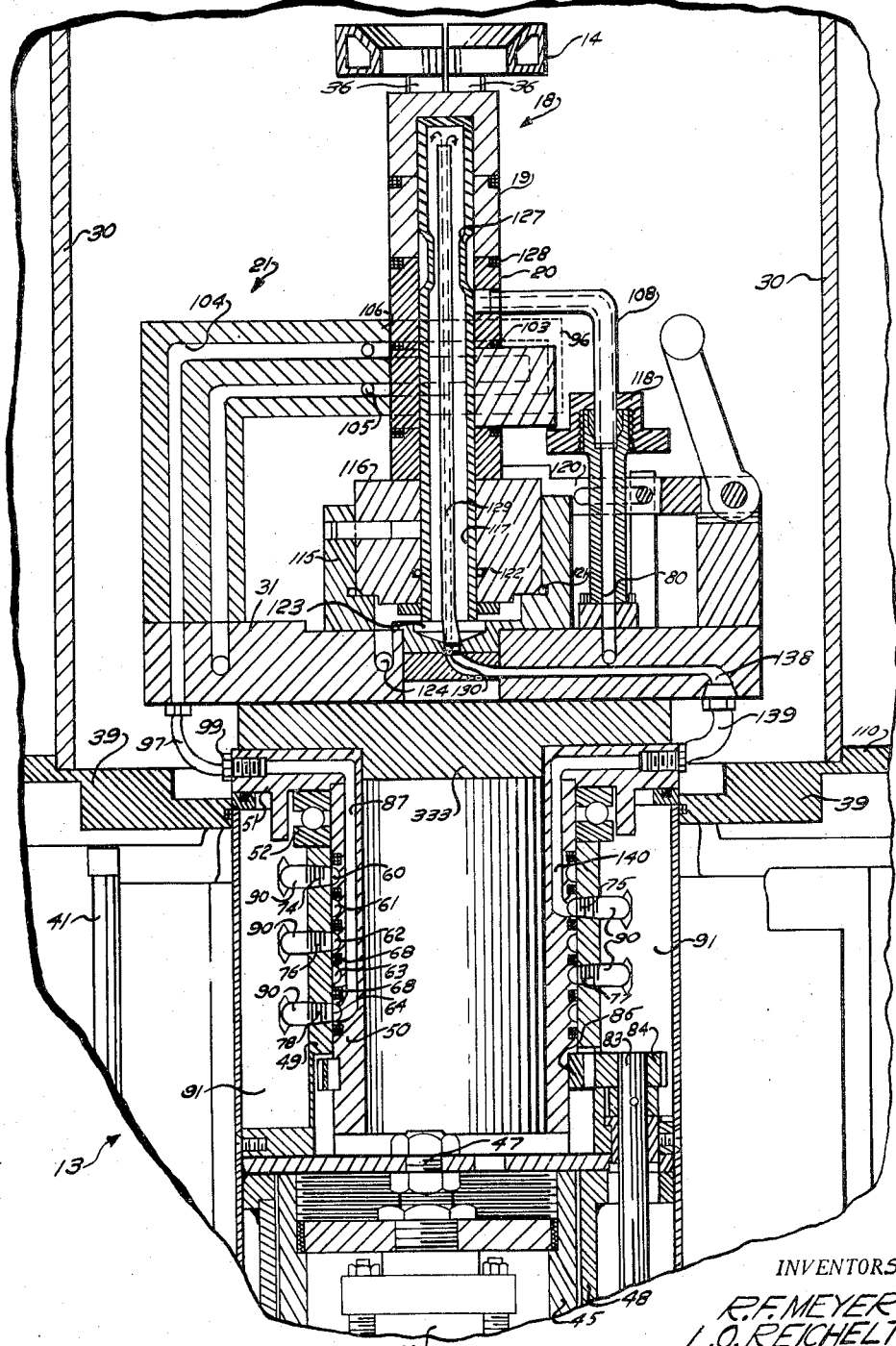

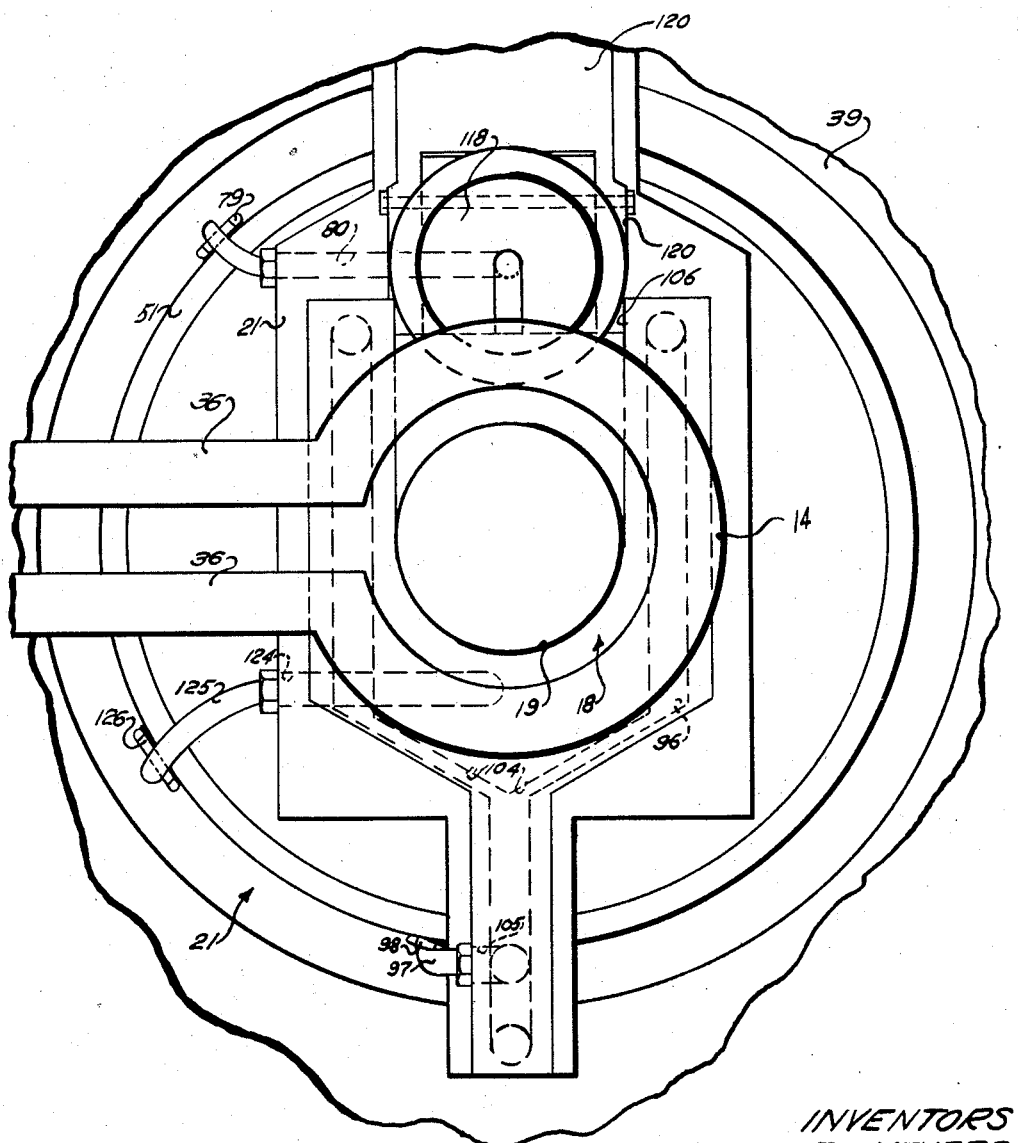

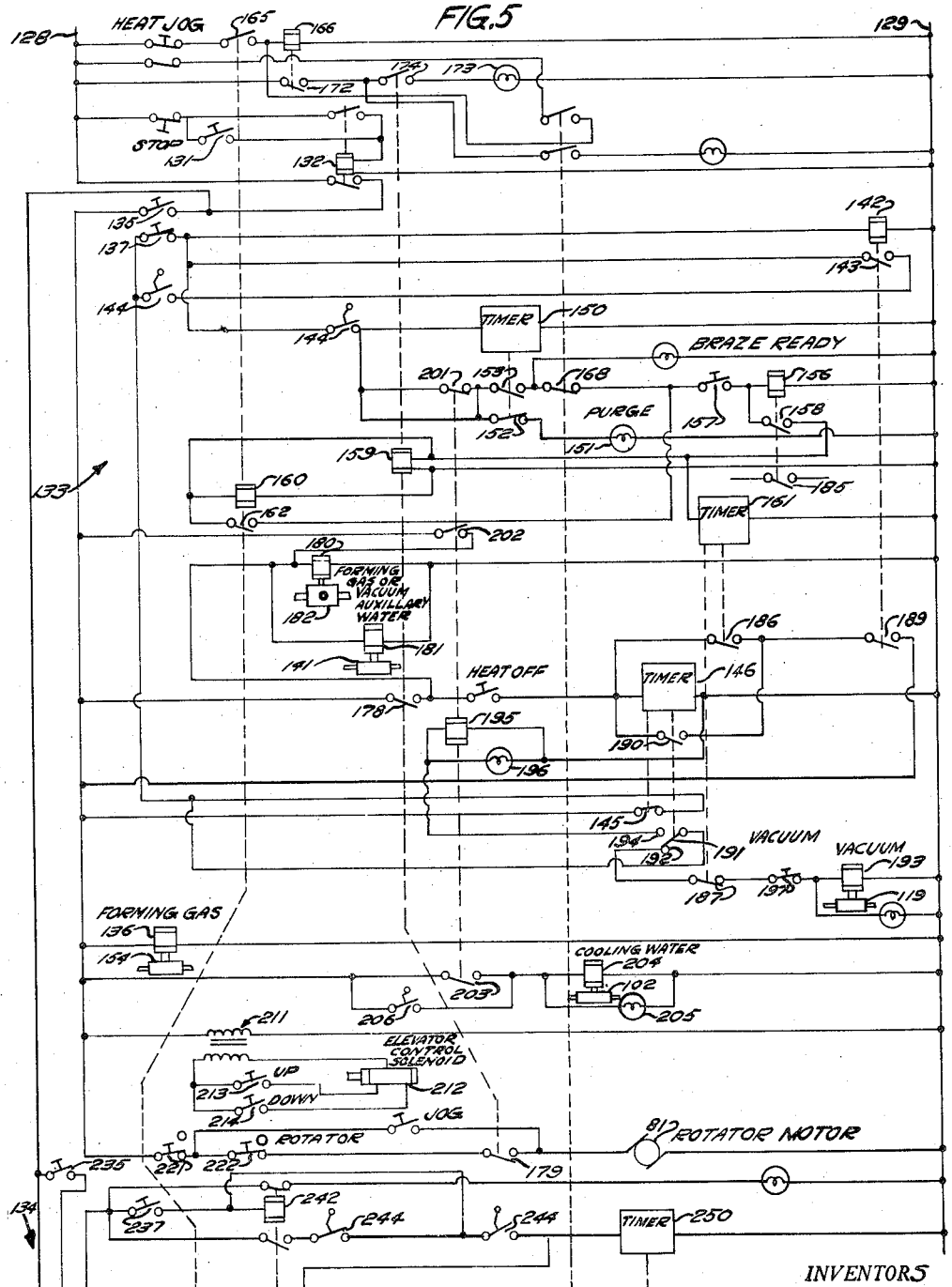

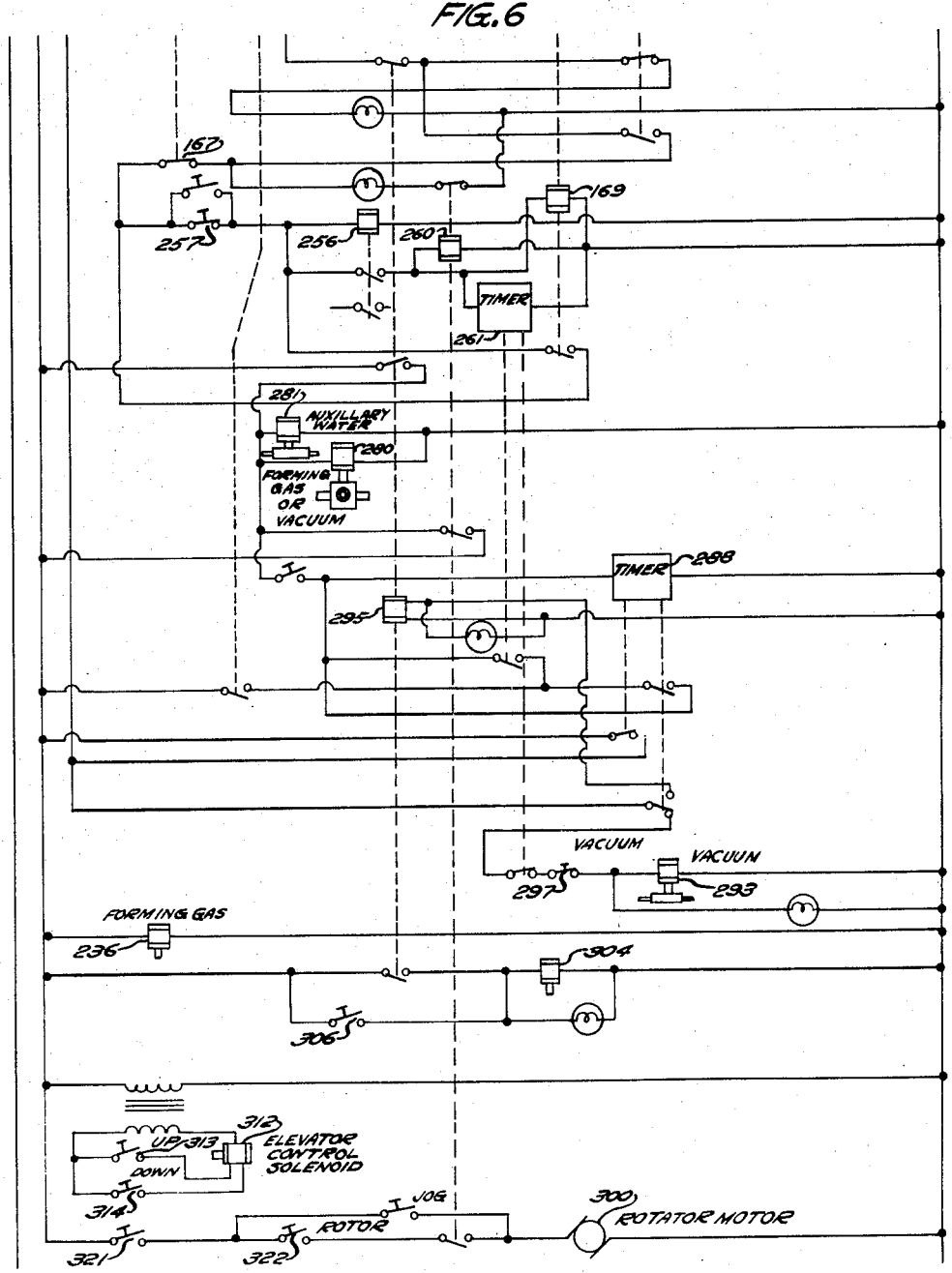

2,851,582

APPARATUS FOR BRAZING PARTS TOGETHER

Ralph F. Meyers, Naperville, Ill., and Lester O. Reichelt, St. Paul, Minn., assignors to Western Electric Company, Incorporated, New York, N. Y., a corporation of New York Application July 21, 1954, Serial No. 444,712

11 Claims. (Cl. 219—85)

This invention relates to apparatus for brazing parts together, and more particularly to apparatus for automatically supporting hollow parts of a magnetron to be brazed, surrounding the parts with a reducing atmosphere, brazing the parts together and cooling the parts after brazing.

An object of the invention is to provide new and improved apparatus for brazing parts together.

Another object of the invention is to provide apparatus for automatically supporting hollow parts of a magnetron to be brazed, surrounding the parts with a reducing atmosphere, brazing the parts together and cooling the parts after brazing.

A further object of the invention is to provide apparatus for brazing magnetron parts together sequentially at a plurality of stations with a single induction heating generator.

An apparatus illustrating certain features of the invention may include an induction heating generator for supplying a high frequency voltage sequentially to a plurality of induction heating coils, each located at a separate brazing station. At each station, there is provided means for supporting tubular parts of a magnetron to be brazed together, means for cooling portions of the parts during brazing, means for supplying an atmosphere of forming gas around the parts to be brazed and means for evacuating the interiors of the parts to be brazed. A control circuit at each station serves to automatically prepare the station for brazing and initiate the cooling during brazing to prevent previously brazed portions from being unbrazed.

A complete understanding of the invention may be obtained from the following detailed description of an apparatus forming a specific embodiment thereof, when read in conjunction with the appended drawings, in which Fig. 1 is a top plan view of an apparatus forming one embodiment of the invention;

Fig. 2 is an enlarged, vertical section taken along line 2—2 of Fig. 1;

Fig. 3 is a fragmentary, enlarged vertical section of a portion of the apparatus shown in Fig. 2;

Fig. 4 is a fragmentary plan view taken along line 4—4 of Fig. 3;

Fig. 5 is a diagrammatic view of a portion of a control circuit for the apparatus shown in Fig. 1, and Fig. 6 is a diagrammatic view of the remaining portion of the control circuit.

Referring now in detail to the drawings, there is shown in Fig. 1 a radio frequency brazing generator 10 of a well known type and extending therefrom a rectangular housing 12. Extending from both sides of the housing at conveniently spaced points are four pairs of brazing terminals 15 to which work coils 14 of brazing stations 13 for brazing are attached, the brazing stations being adjacent to the housing and centrally aligned with the terminals 15.

A typical brazing operation with this apparatus may include placing an article 18 (See Figs. 2, 3 and 4), such as a part of a magnetron, having parts 19 and 20 to be brazed together on a holding fixture 21, elevating the fixture 21 to a predetermined position within the brazing work coil 14, lowering an enclosure or bell jar 30 over the work, purging (displacing entrapped air with forming gas) for a predetermined time, brazing either with manual or automatic control for a predetermined time, the fixture being rotated by a support 31 to rotate the magnetron within the coil 14 during the time the brazing power is on, providing for evacuation of the parts 19 and 20 prior to brazing, introducing forming gas into the internal portion of the part during brazing, and cooling during a succeeding predetermined cooling period.

Each station 13 includes a stationary frame 41 (Figs. 2 and 3) supporting a top 39, and a guard 42 and the enclosure or jar 30 are attached to a supporting frame 43. The frame 43 supports an elevating and rotating mechanism 44, and supporting conduits 36 for cooling water and high frequency current project upwardly from the top 39 into the jar 30. The conduits 36 are supported by the top 39 outside the path of revolution of the fixture 21. The mechanism 44 includes a fixed tube 45 rigidly supporting a cylinder 46 having attached to its piston 47 an external sleeve 48 arranged to slide vertically on the outside diameter of the tube 45. A sleeve 49 is fixed to the top of the sleeve 48, and mounts a rotor 50 therein through a thrust bearing 52. An annular table or base 51 is fixed to the top of the rotor 50, and supports the brazing fixture 21 rigidly and detachably thereon. The rotor 50 has circumferential grooves 60, 61, 62, 63 and 64 (Fig. 3) and sealing rings 68. Communicating with annular grooves 62, 63 and 64 are ports 74, 75, 76, 77 and 78 in the sleeve 49. During rotation of the rotor 50, vacuum connections are made from the groove 62 to the external portions of the table 51 through a passage (not shown) in the rotor 50, and a hose connector 79 (Fig. 4) connects this passage to a passage 80 in the holding fixture 21.

The sleeve 48 (Figs. 2 and 3) mounts a motor 81 which drives the rotor 50 through a gear train 82, a shaft 83, a gear 84 and a ring gear 85 keyed to the rotor 50, thus providing rotatable motion to the fixture mounting base 51. Flexible leads (not shown) are provided for connecting power to the motor 81, and flexible hoses 89 are connected to pipes 90 leading to ports 74, 75, 76, 77 and 78, the pipes 90 being supported by a sleeve 91 rigidly secured to the cylinder 49. The control of the elevation of the piston 47 is by air brought to a solenoid valve 98 at the base of the air cylinder 46. The groove 64 is connected by a passage 87 to a pipe fitting 99 mounted on the table 51 secured rigidly to the cylinder 49.

The port 78 is connected to one hose 89 which leads to a valve 102 (Fig. 5) connected to a source of cooling water under pressure. When this valve is open, water is forced through the groove 64, the passage 87, a hose 97, a forked passage 104 in a cooling block or yoke 96 surrounding a previously brazed portion 103 of the article. The water flows back through the block 96 through a forked return passage 105 to a hose 97 (Fig. 4), a fitting 98, a passage (not shown) in the rotor 50, the groove 60 and the port 76 to one hose 89 to return the cooling water to the source of water. The cooling block 96 is provided with a U-shaped socket 106 for receiving the article in contact therewith.

The parts 19 and 20 of the article 18 are hollow, and the part 20 has a tube 108 leading from the interior thereof and rests on a support 116 of the fixture 21 in a position fitting closely on a cooling tube or pipe 117 and in the socket 106. The tube 117 also extends in close fitting engagement into the part 19. The tube 108 of the part 20 is connected by a seal 118 to the passage 80 in the fixture 21 leading to the groove 62 and it connects the pipe 90 and hose 89 leading to a valve 119 (Fig. 5) connected to a vacuum pump (not shown).

A clamping fork 120 (Fig. 3) presses the block 116 tightly against a seal 121 in a cup 115, and a seal 122 seals the tube 117 to the block 116. The tube 117 leads into a chamber 123 having an outlet passage 124 connected to a hose 125 (Fig. 4) leading to a port 126 and a passage (not shown) in the table 51 leading to the groove 63, which is connected by the port 77 and the associated pipe 90 and hose 89 to the return line (not shown) of a source of water. The pipe 117 has a neck 127 adjacent to the juncture of the parts 19 and 20 to prevent contact between the cooling pipe and the portions of these parts to be brazed together by a silver solder ring 128. A supply pipe 129 is screwed into a socket 130 at one end of a passage 138 connected by a hose connection 139 to a passage 140 leading to the groove 61 to which cooling water under pressure is supplied to flow the water down through the tube 117. The port 75, the pipe 90 and the hose 89 connected to the groove 61 lead from a valve 141 (Fig. 5) connected to a source of cooling water under pressure.

A cover 109 (Fig. 2) of the enclosure 30 prevents the escape of gas from the top of the enclosure, the enclosure being supported at the lower end of the cylinder on a flange 110 of the guard 42. The guard 42 is slidably mounted on a guide tube 113 and is maintained in proper position by a balance-weight 114 sliding within the guide tube 113 and connected to the guard through pulleys 114 and a chain 115'.

Assuming that the generator 10 has been started, the mechanism 16 has been loaded with a fixture 21 carrying parts 19 and 20 to be brazed together and the enclosure 30 has been lowered over the fixture 21, a start switch 131 (Fig. 5) is closed manually to energize in a relay 132 across powerline conductors 128 and 129 to supply power to four individual control circuits, of which only control circuits 133 and 134 are shown, the remaining two control individual circuits being identical with the circuits 133 and 134 and interlocking with the circuits 133 and 134 and each other as the circuits 133 and 134 interlock with one another. A toggle switch 135 is closed to actuate a forming gas solenoid 136 to open a valve 154 in a supply line of forming gas leading to the interior of the enclosure 30 through a hose 141 (Fig. 2).

A momentary switch 137 is closed to lock in a relay 142 through holding contacts 143, one of pressure responsive switches 144, which are closed by pressure of forming gas in the hose 141 to the top of the enclosure 30, and normally closed contacts 145 of a timer 146.

Actuation of the relay 142 actuates a timer 150 set to time out after a predetermined period of time sufficient to completely fill the enclosure 30 with forming gas, during which period an indicating lamp 151 is energized through contacts 152. When the timer 150 times out, it opens contacts 152 and closes contacts 153, and a relay 156 is energized through a toggle switch 157 to close contacts 158 to actuate relays 159 and 160 and start a timer 161, which immediately opens contacts 187 and closes contacts 186 after a delay. The relay 160 locks in itself, the relay 159 and the timer 161 through contacts 162. The timer 161 starts, and the relay 160 closes contacts 165 to a relay 166 and opens contacts 167 in the circuit 134, which prevents the induction heating coil associated with the circuit 134 from being connected to the generator 10, a function identical with that effected with respect to the circuit 133 by contacts 168 of a relay 169 of the circuit 134. The relay 166 closes contacts 172 to light a lamp 173 through the contacts 172 and contacts 174 of the relay 159, which indicates that brazing is occurring at the station 13 which the circuit 133 controls.

The relay 159, when energized, closes contacts 174, 178 and 179, and closing of contacts 178 actuates solenoids 180 and 181 to actuate a three-way valve 182 to stop evacuating the interior of the article 18 through the tube 108 (Fig. 3) and start forming gas into the interior through the groove 62 and the passage 80. Closing of the contacts 179 starts the motor 81 to rotate the rotor 50 and the fixture 21 so that all portions of the parts 19 and 20 will be uniformly brazed, contacts 185 of the relay 156 having been closed to connect the generator 10 (Fig. 1) to the induction heating coil 14 of the station controlled by the circuit 133.

When the solenoid 181 is energized, it actuates the valve 141 to connect the tube 129 to cooling water under pressure, and water flows up through the tube 129 and down through the tube 117 to cool the portions of the parts 19 and 20 on opposite sides of the joint to be brazed. The closing of the contacts 185 causes the induction coil 14 to heat the portions of the parts 19 and 20 forming the joint to be brazed and the solder ring 128 to uniformly braze the parts together around the entire periphery of the joint. The tube 117 cools the previously brazed portions of the parts 19 and 20 without cooling the portion of these parts to be brazed together.

A predetermined period of time after the timer 161 starts, which period starts at the energization of the induction coil 14 and is sufficient for the parts 19 and 20 to be brazed, the timer 161 times out to close contacts 186. Closing of contacts 186 energizes the cooling time timer 146 through contacts 189 of the relay 142. The timer 146 immediately closes maintaining contacts 190 and moves a contact 191 out of engagement with a contact 192 leading to a valve-actuating solenoid 193 and into engagement with a contact 194 leading to a relay 195 and a lamp 196. The valve 119 operated by the solenoid 193 controls water to an aspirator pump (not shown) in the vacuum line to create the vacuum when the water flows through the valve 119. When the solenoid 193 is energized, the valve 119 is opened to actuate the aspirator, and the valve is closed when the solenoid 193 is deenergized.

When the relay 195 is actuated, it opens contacts 201 to drop out the relay 156 to stop the heating and drop out the relays 159 and 160. The energized relay 195 also closes normally open contacts 202 to maintain the solenoids 180 and 181 energized during the cooling period, and closes contacts 203 to energize a solenoid 204 and an indicating lamp 205 to start cooling water to the port 78 leading to the passage 104 and indicate that condition, respectively.

A transformer 211 was energized as soon as the switch 135 was closed to make power available for actuating a double-acting elevator control solenoid 212 to actuate the valve 98 (Fig. 2) to cause the piston 47 to rise by manually closing momentarily a momentary switch 213 (Fig. 5). When it is desired to remove the fixture 21 carrying a brazed article from the brazing station, a momentary switch 214 is closed manually to reverse the solenoid 212, which reverses the valve 98, and the cylinder 46 lowers the piston 47 to retract the article from the coil 14.

The construction and operation of the control circuit 134 are identical with those of the control circuit 133, the circuit 134 including switches 235, 237, 244, 257, 297, 306, 313, 314, 321 and 322 corresponding to the switches 135, 137, 144, 157, 197, 206, 213, 214, 221 and 222, respectively. Similarly, timers 250, 261 and 288 correspond to timers 150, 161 and 146, respectively, and relays and solenoids 236, 242, 256, 260, 280, 281, 293, 295, 304 and 312 correspond to the elements 136, 142, 156, 160, 180, 181, 193, 195, 204 and 212, respectively, in the circuit 133. Also, there is provided a motor 300 for rotating the fixture at the second station. The relays 160 and 169 of the two circuits 133 and 134 insure operation of only one station at a time so that one station may only be unloaded and loaded with fixtures 21 carrying similar parts for brazing while the other is brazing. Similar interlocks (not shown) are provided between each of the control circuits (not shown) of the other two stations and the circuits 133 and 134 so that only one brazing station may be operated at one time though the others may be prepared for operation.

Operation

While a brazing operation is conducted at one of the stations 13 other than that which the circuit 133 controls, the fixture 21 having the parts 19 and 20 to be brazed loaded thereon is placed in position on the table with a boss 333 of the fixture projecting tightly into the rotor 50 and keyed thereto. The hose connections between the water and vacuum passages 104, 105, 80, 138 and 124 in the fixture 21 and the passages in the rotor 50, illustrated by the passages 87 and 140, leading to the grooves 60, 61, 62, 63 and 64 are made. The enclosure 30 and the guard then are lowered over the fixture to seat tightly against the top 39 of the frame 41. Then, as the brazing at the other station is completed, the operator closes the switches 135 and 137. The switch 135 is left closed, and actuates the solenoid 136 to open the valve 154 to force forming gas under a pressure slightly greater than atmospheric pressure into the enclosure 30, air being forced out of the enclosure through the not quite tight joint between the enclosure 30 and the top 39. The valve 119 also is opened to supply water to actuate the aspirator (not shown) to apply vacuum to one of the ports of the valve 182 and evacuate air from the interior of the parts 19 and 20 through the passage connections between the tube 108 and the valve 182. The pressure of the gas in the enclosure 30 closes the switches 144, and the relay 142 is locked in and the timer 150 is started but does nothing until it times out. Then, after the enclosure 30 and the parts 19 and 20 are filled with forming gas, the timer 150 times out to open the contacts 152 and close the contacts 153, which energize the relay 156 to close contacts 158 and 185 to start the timer 161 and energize relays 159 and 160. The relay 159 energizes the solenoids 180 and 181 to actuate the valves 182 and 141. The valve 182 closes off the vacuum line to the interior of the parts 19 and 20 and connects forming gas thereto. The valve 181 connects water under pressure to start cooling water through the tube 129. The timer 161 opens the contacts 187 immediately on actuation to stop the aspirator by shutting off the valve 119.

Before the timer 150 times out, the operator closes the switch 213 to cause the cylinder 46 (Fig. 2) and the piston 47 to raise the rotor 50, the sleeves 49 and 91 and the motor 80 to raise the joint between the parts 19 and 20 to the induction heating coil 14. When the heater is started through the contacts 185 and the relay 159 is energized to start the rotator motor 80, the brazing starts and the fixture 21 is rotated so that the joint between the parts 19 and 20 and the solder ring 128 are heated uniformly, the ring 128 is melted and the parts are secured together. Then the timer 161 times out to start the timer 146 through contacts 186.

The timer 146 immediately closes holding contacts 190, opens contacts 192 and closes contacts 194. The contacts 194 actuate the relay 195 to close contacts 202 to keep the solenoids 180 and 181 energized, opens contacts 201 to drop out the relay 156 and closes contacts 203 to actuate the valve 202 to supply cooling water to the yoke 96. The relay 156 resets the braze time controlling timer 161, stops the brazing, drops out the interlocking relay 160 to permit brazing at the station 13 controlled by the circuit 134 and drops out the relay 159 to stop rotation of the rotor 50. While the timer 146, which is the cooling timer, runs, water flows to the yoke 96 and the tube 117 to cool the parts. When the timer 146 times out, it opens the contacts 145 to cut off power to drop out the solenoids 180, 181 and 204 and drop out the relay 142 to reset the circuit 133. The operator then presses the down switch 214 to lower the elevator, pulls the enclosure 30 up, disconnects the fixture 21 from the station and removes it, after starting a brazing operation with the circuit 134.

A brazing operation may be conducted at only one of the stations at one time, so that there is no overloading the heater and the apparatus effects each brazing operation automatically so that the operator may be loading and unloading at the other stations. It will be noted that the circuits are provided with switches for manual operation rather than automatic and indicating lamps to indicate the condition of the circuit. The apparatus permits parts to be loaded, raised to the brazing height and rotated while in the raised position.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A brazing apparatus, which comprises a heating element, a work-holding fixture having an internal passageway, a sleeve secured to the fixture having a circumferential groove communicating with a passageway therethrough running to the internal passageway in the fixture, means for moving the work-holding fixture to the heating element, means for rotating the fixture, and means for supplying a coolant through the groove and passageways to the fixture as it is rotated.

2. A brazing apparatus, which comprises a heating element, a cylinder, means for raising and lowering the cylinder to move it toward and away from the heating element, a rotor mounted rotatably in the cylinder, a workholder mounted on the rotor and detachable therefrom, said workholder and said rotor being provided with interconnected fluid passages, sealed rotatable fluid connections between the cylinder and the rotor, means for supplying fluid from the cylinder to the fluid connections, and rotor driving means carried with the cylinder.

3. A brazing apparatus, which comprises a heating element, a sleeve, means for raising and lowering the sleeve to move it toward and away from the heating element, a cylindrical rotor having a plurality of spaced exterior grooves mounted rotatably in the sleeve, a work-holder mounted on the rotor and detachable therefrom, said workholder and said rotor being provided with interconnected fluid passages from the grooves, sealing means between the rotor and the sleeve to separate the grooves, means for supplying fluid from the sleeve to the grooves, and rotor driving means carried with the sleeve.

4. A brazing apparatus, which comprises a gas enclosure, means for supplying a reducing gas to the interior of the enclosure, heating means positioned in the upper part of the enclosure, a work-holding fixture provided with fluid passages therein, a cylindrical rotor supporting the fixture in the lower part of the enclosure, a sleeve supporting the rotor therein and permitting rotation of the rotor, said sleeve having a plurality of ports spaced therealong, said rotor having a plurality of annular exterior grooves one for each port positioned at the ports and passages leading from the grooves to the passages in the fixture, sealing means positioned between adjacent grooves and ports, means for supplying fluid to the ports, means for raising and lowering the sleeve relative to the heating means to move parts to be brazed held by the fixture to and away from the heating means, a ring gear keyed to the lower end of the rotor, a pinion carried by the sleeve meshing with the ring gear, and means carried by the sleeve for rotating the pinion.

5. A brazing apparatus, which comprises a gas enclosure, means for supplying a reducing gas to the interior of the enclosure, an induction heating coil positioned in the upper part of the enclosure, a work-holding fixture provided with fluid passages therein, a cylindrical rotor supporting the fixture in the lower part of the enclosure, a sleeve mounted vertically supporting the rotor therein and permitting rotation of the rotor, said sleeve having a plurality of ports spaced therealong, said rotor having a plurality of annular exterior grooves one for each port positioned at the ports and passages leading from the grooves to the passages in the fixture, sealing rings positioned between adjacent grooves and ports, means for supplying fluid to the ports, means for raising and lowering the sleeve relative to the heating coil to move parts to be brazed held by the fixture into and out of the coil, a ring gear keyed to the lower end of the rotor, a pinion carried by the sleeve meshing with the ring gear, and means carried by the sleeve for rotating the pinion.

6. A brazing apparatus, which comprises a table having a hole therein, a bell jar having an inlet movable between an open position above the table and a closed position on the table surrounding the hole, an induction heating coil positioned above the hole and supported by the table, a sleeve slidable vertically in the hole, pneumatic means for moving the sleeve vertically, a rotor supported rotatably in the sleeve, rotatable fluid connections between the sleeve and the rotor, means carried by the sleeve for rotating the rotor, a work-holder supported by the rotor for moving work to be brazed into the coil, means for supplying forming gas to the inlet of the bell jar, means for supplying cooling water to one of the fluid connections, means for withdrawing the cooling water from another of the fluid connections, and means for applying a vacuum to another of the fluid connections to evacuate hollow parts held by the work-holder.

7. A brazing apparatus, which comprises a table having a hole therein, a bell jar having an inlet movable between an open position above the table and a closed position on the table surrounding the hole, an induction heating coil positioned above the hole, a sleeve slidable vertically in the hole, pneumatic means for moving the sleeve vertically, a rotor supported rotatably in the sleeve, rotatable fluid connections between the sleeve and the rotor, means carried by the sleeve for rotating the rotor, a work-holder supported by the rotor for moving work to be brazed into the coil, means for supplying forming gas to the inlet of the bell jar, means for supplying cooling water to one of the fluid connections, means for withdrawing cooling water from another of the fluid connections, means for applying a vacuum to another of the fluid connections to evacuate hollow parts held by the work-holder, means for actuating the gas-supplying means, timing means for actuating the heating coil and the water supplying means and stopping the vacuum-applying means after the forming gas-supplying means has operated a predetermined period of time, timing means for stopping the heating coil after a predetermined period of operation, and means for stopping the water-supplying means a predetermined period of time after the heating coil has been stopped.

8. A brazing apparatus, which comprises, a table having a hole therein, a bell jar having an inlet movable between an open position above the table and a closed position on the table surrounding the hole, an induction heating coil positioned above the hole, a sleeve slidable vertically in the hole, pneumatic means for moving the sleeve vertically, a rotor supported rotatably in the sleeve for rotation on a vertical axis, said rotor having spaced external peripheral grooves and passages leading from the grooves to the upper end of the rotor, said sleeve having ports communicating with the grooves, sealing rings positioned between the grooves engaging the sleeve and the rotor, means carried by the sleeve for rotating the rotor, a work-holder supported by the rotor for moving work to be brazed into the coil, means for supplying forming gas to the inlet of the bell jar, means for supplying cooling water to one of the ports, and means for withdrawing water from another of the ports.

9. A brazing apparatus, which comprises a heater, means for supporting a pair of parts to be brazed together, a cylindrical rotor having a plurality of exterior circumferential grooves spaced therealong and passages extending from the grooves to one end thereof for carrying the parts-supporting means, a sleeve holding the rotor against thrust and permitting rotation thereof, means for rotating the rotor in the sleeve, said sleeve having ports juxtaposed to the grooves in the rotor, a heat-exchange member carried by the rotor having a passage therethrough, conduit means connecting one end of the passage in the heat-exchange member to one of the passages in the rotor, means for supplying cooling water to the port leading to the groove in communication with the last-mentioned passage, conduit means connecting the other end of the passage in the heat-exchange member to another passage in the rotor, and means for withdrawing cooling water from the port leading to the groove in communication with the last-mentioned passage in the rotor.

10. A brazing apparatus for a pair of hollow parts to be brazed of which one has a tube leading to the interior thereof which comprises means for supporting said parts, a cylindrical rotor having a plurality of exterior circumferential grooves spaced therealong and passages extending from the grooves to one end thereof for carrying the supporting means, a sleeve fitting closely around the rotor serving to hold the rotor against thrust and permit rotation thereof, said sleeve having ports leading to the grooves in the rotor, conduit means connecting the tube to one of the passages, a fluid-propelling means connected to the port juxtaposed with respect to the last-mentioned groove, a heat-exchange member carried by the rotor having a passage therethrough, conduit means connecting one end of the passage in the heat-exchange member to another of the passages in the rotor, means for supplying cooling water to the last-mentioned groove in communication with the last-mentioned passage, conduit means connecting the other end of the passage in the heat-exchange member to another of the passages in the rotor, and means for withdrawing cooling water from the groove in communication with the last-mentioned passage.

11. In a work piece heating apparatus, a heating means, a holder for positioning a work piece in close proximity to said heating means, said work holder having a plurality of passageways formed therein, a cylindrical rotor supporting said work holder, said rotor having circumferential grooves and passageways interconnecting the grooves with the passageways formed in the work holder, a sleeve encompassing said rotor and having ports formed therein communicating with said grooves, fluid conduit means connected with said ports, means for supplying fluid through said ports, grooves and passageways, and means for rotating said rotor while fluid is supplied to said passageways.

References Cited in the file of this patent

UNITED STATES PATENTS

| | | |
|---|---|---|
| 2,238,082 | Somes | June 15, 1941 |
| 2,280,689 | Denneen et al. | Apr. 21, 1942 |
| 2,288,035 | Somes | June 23, 1942 |
| 2,329,944 | Schakenbach | Sept. 21, 1943 |
| 2,341,739 | Olt | Feb. 15, 1944 |
| 2,348,032 | Somes | May 2, 1944 |
| 2,386,820 | Spencer | Oct. 16, 1945 |
| 2,451,518 | Strickland | Oct. 19, 1948 |
| 2,452,365 | Frederick | Oct. 26, 1948 |
| 2,496,950 | Marcus | Feb. 7, 1950 |
| 2,616,016 | Shenk | Oct. 28, 1952 |
| 2,654,822 | Agule | Oct. 6, 1953 |
| 2,663,789 | Redmond | Dec. 22, 1953 |
| 2,666,121 | Allardt | Jan. 12, 1954 |
| 2,666,841 | Laver | Jan. 19, 1954 |